US012615090B2

(12) United States Patent
Yeluripati et al.

(10) Patent No.: US 12,615,090 B2
(45) Date of Patent: Apr. 28, 2026

(54) SYSTEMS AND METHODS FOR ENABLING AN OPTICS BASED COMPUTE SYSTEM ASSOCIATED WITH TRANSMISSION AND RECEPTION

(71) Applicant: Lightspeed Photonics Private Limited, Hyderabad (IN)

(72) Inventors: Rohin Kumar Yeluripati, Ramachandrapuram (IN); Venkata Ramana Pamidighantam, Hyderabad (IN)

(73) Assignee: LIGHTSPEED PHOTONICS PRIVATE LIMITED, Hyderabad (IN)

( * ) Notice: Subject to any disclaimer, the term of this patent is extended or adjusted under 35 U.S.C. 154(b) by 333 days.

(21) Appl. No.: 18/256,904

(22) PCT Filed: Dec. 8, 2021

(86) PCT No.: PCT/IN2021/051147
§ 371 (c)(1),
(2) Date: Jun. 9, 2023

(87) PCT Pub. No.: WO2022/123598
PCT Pub. Date: Jun. 16, 2022

(65) Prior Publication Data
US 2024/0031032 A1      Jan. 25, 2024

(30) Foreign Application Priority Data
Dec. 10, 2020    (IN) .............................. 202041053757

(51) Int. Cl.
*H04B 10/50*        (2013.01)
(52) U.S. Cl.
CPC .................................. *H04B 10/501* (2013.01)

(58) Field of Classification Search
CPC ..................................................... H04B 10/501
(Continued)

(56) References Cited

U.S. PATENT DOCUMENTS 7,343,058 B2 *   3/2008   Block ................ G02B 6/12004
385/28
10,054,737 B2 *   8/2018   Kobrinsky ........... G02B 6/4214
(Continued)

FOREIGN PATENT DOCUMENTS

JP          2019152848  A      9/2019
WO     WO-2014101780  A1 *   7/2014   ........... H10F 77/413

OTHER PUBLICATIONS

Hayakawa et al; Silicon photonics optical transceiver for high-speed, high density and low power LSI interconnect; Jan. 2016, Fujitsu Sci Tech, J. vol. No. 1, pp. 1-8. (Year: 2016).*
(Continued)

*Primary Examiner* — Amritbir K Sandhu
(74) *Attorney, Agent, or Firm* — Barta Jones, PLLC

(57)          ABSTRACT
Provided are systems and methods for enabling an optics based compute system associated with transmission and reception for data processing and communication which solve the problem of computation coupled with transmission and/or reception associated with high data rate application with significant accuracy and at a low power consumption. The disclosed systems and methods complements higher data rate processing supported with higher data rate transmission and/or reception with compact packaging, lower power consumption, heat dissipation, available at low cost. This is achieved by using efficient design, packaging, and coupling of an electronic engine, and an optical engine, using a plurality of fiducials, substrate, and power couplers. Optical signal is transmitted from a first system and transmitted optical signal is received by a second system.

15 Claims, 8 Drawing Sheets

(58) Field of Classification Search
 USPC ......................................................... 398/182
 See application file for complete search history.

(56) References Cited

U.S. PATENT DOCUMENTS

| | | | |
|---|---|---|---|
| 11,899,251 B2 * | 2/2024 | Zhang .................. | G02B 6/4249 |
| 2016/0226592 A1 * | 8/2016 | Arvelo .................. | G02B 6/425 |
| 2017/0148955 A1 * | 5/2017 | Wu ........................ | H10F 77/933 |
| 2018/0241517 A1 * | 8/2018 | Gloeckner ............. | H04B 10/40 |
| 2019/0067260 A1 * | 2/2019 | Koyama ................. | H01L 24/92 |
| 2024/0031035 A1 * | 1/2024 | Igarashi ............. | H04B 10/6165 |

OTHER PUBLICATIONS

Bernabe et al; Chip-to-chip optical interconnections between stacked self-aligned SOI photonic chips ;Mar. 2012; Optical society of America; pp. 1-9. (Year: 2012).*
International Search Report and Written Opinion received for International Patent Application No. PCT/IN2021/051147, issued on Mar. 1, 2022, 9 pages.
Hayakawa, Akinori, et al., "Silicon Photonics Optical Transceiver for High-speed, High-density and Low-power LSI Interconnect", Fujitsu Scientific & Technical Journal, vol. 52, No. 01, Jan. 2016, pp. 19-26.

* cited by examiner

100

101/103

249

231

233

235

241

243

245

247

237A    239    237B

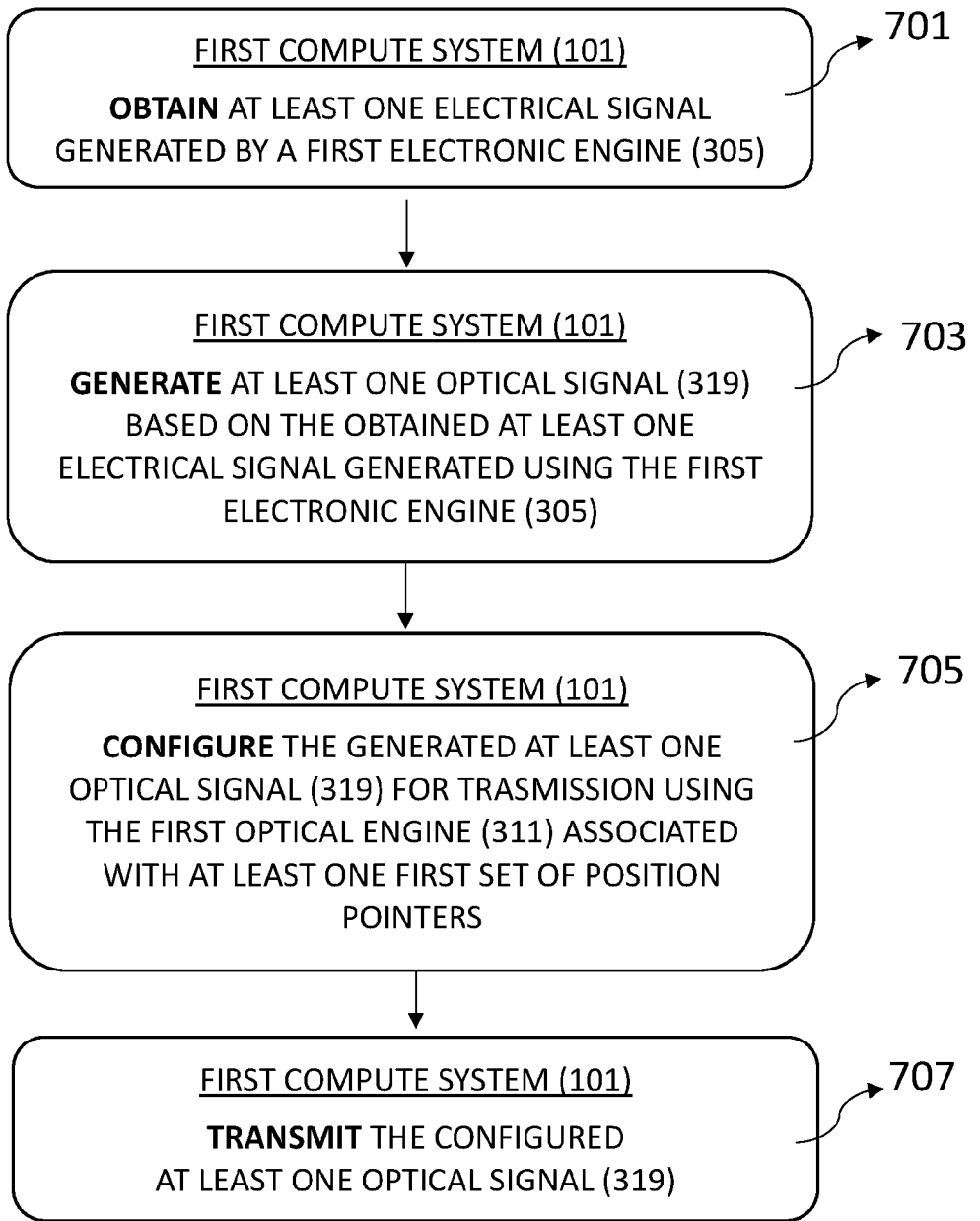

FIRST COMPUTE SYSTEM (101)

OBTAIN AT LEAST ONE ELECTRICAL SIGNAL GENERATED BY A FIRST ELECTRONIC ENGINE (305)

701

FIRST COMPUTE SYSTEM (101)

GENERATE AT LEAST ONE OPTICAL SIGNAL (319) BASED ON THE OBTAINED AT LEAST ONE ELECTRICAL SIGNAL GENERATED USING THE FIRST ELECTRONIC ENGINE (305)

703

FIRST COMPUTE SYSTEM (101)

CONFIGURE THE GENERATED AT LEAST ONE OPTICAL SIGNAL (319) FOR TRASMISSION USING THE FIRST OPTICAL ENGINE (311) ASSOCIATED WITH AT LEAST ONE FIRST SET OF POSITION POINTERS

705

FIRST COMPUTE SYSTEM (101)

TRANSMIT THE CONFIGURED AT LEAST ONE OPTICAL SIGNAL (319)

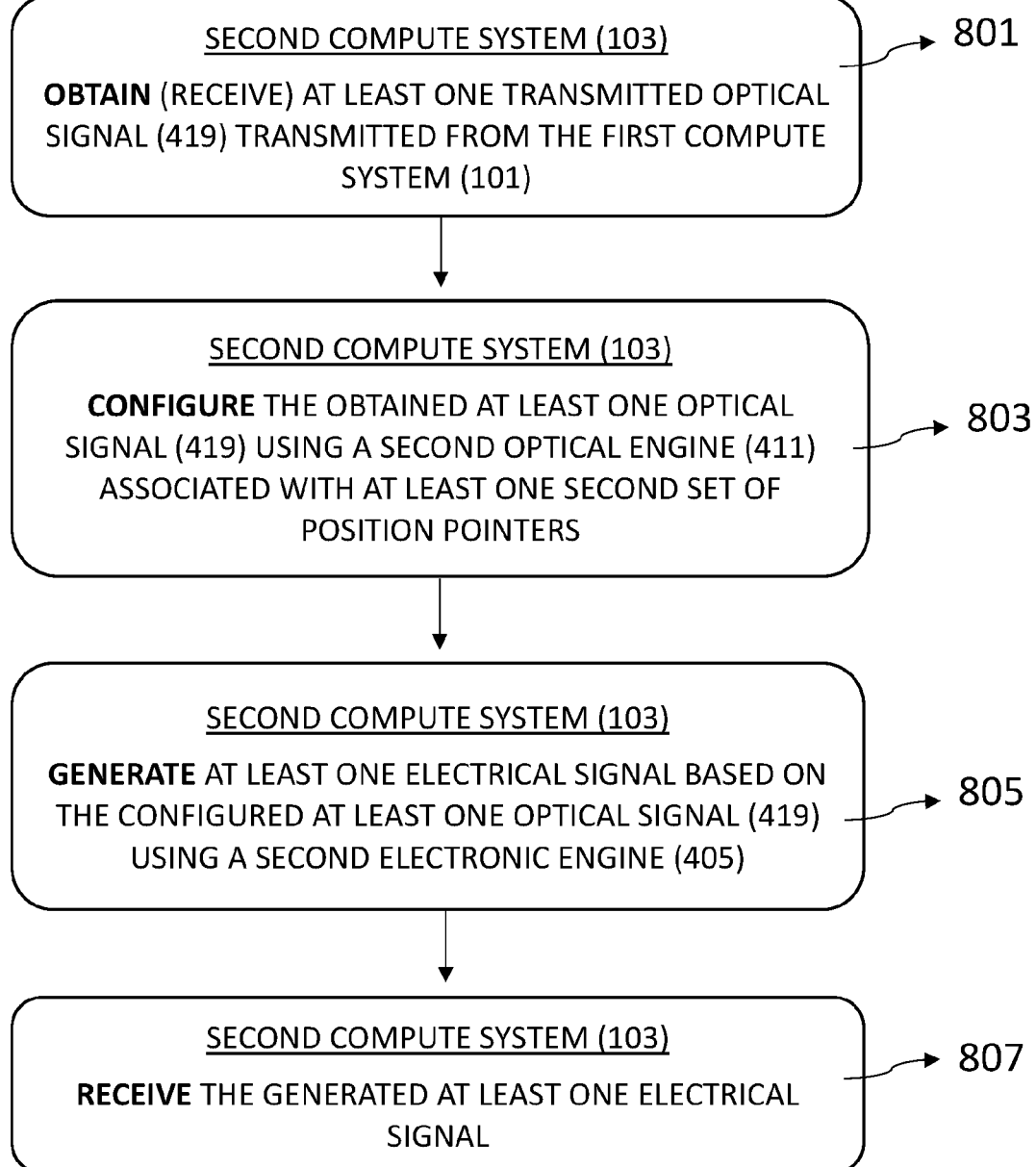

SECOND COMPUTE SYSTEM (103)

OBTAIN (RECEIVE) AT LEAST ONE TRANSMITTED OPTICAL SIGNAL (419) TRANSMITTED FROM THE FIRST COMPUTE SYSTEM (101)

801

SECOND COMPUTE SYSTEM (103)

CONFIGURE THE OBTAINED AT LEAST ONE OPTICAL SIGNAL (419) USING A SECOND OPTICAL ENGINE (411) ASSOCIATED WITH AT LEAST ONE SECOND SET OF POSITION POINTERS

803

SECOND COMPUTE SYSTEM (103)

GENERATE AT LEAST ONE ELECTRICAL SIGNAL BASED ON THE CONFIGURED AT LEAST ONE OPTICAL SIGNAL (419) USING A SECOND ELECTRONIC ENGINE (405)

805

SECOND COMPUTE SYSTEM (103)

RECEIVE THE GENERATED AT LEAST ONE ELECTRICAL SIGNAL

SYSTEMS AND METHODS FOR ENABLING AN OPTICS BASED COMPUTE SYSTEM ASSOCIATED WITH TRANSMISSION AND RECEPTION

CROSS REFERENCE TO RELATED PATENT APPLICATIONS

This application is a U.S. National Phase of International Patent Application No. PCT/IN2021/051147 filed on Dec. 8, 2021, which claims the priority to and benefit of Indian Provisional Patent Application No. 202041053757 filed on Dec. 10, 2020. Each of the above-referenced applications is hereby incorporated herein by reference in its entirety.

FIELD OF THE INVENTION

The present invention relates to hardware design in computation and communication technology domain for data processing and communication. More specifically, the invention relates to systems and methods for enabling an optics based compute system associated with transmission and reception for data processing and communication.

BACKGROUND OF THE INVENTION

Higher integration has become a trend in modern electronic packaging. One of the major challenges is to improve the thermo mechanical reliability when the package is subjected to thermal loads. However, the conjunct interfaces near the free edge always suffer high stress gradients and even can generate cracks, because the packaging components are fabricated with different thermal and mechanical properties.

Eventually, when the system has ability to process significant load of data, the system needs to be provided with adequate data at a required rate. In traditional systems, numbers of instructions executed by the processor will be proportional to the rate at which data is received. In such cases scheduling algorithms associated with operating systems will be able to enable effective resource utilization. When the system has capacity to execute instructions at an improved rate, and if the instructions to be executed are not fetched at the required rate, it would affect resource utilization cycle of the system.

Further, in case of re-configuring the servers in a data center or/and in upgrading the data center infrastructure, procurement and deployment of resources is always a hectic process both in terms of technical as well as amount of manual work involved. Hence, there is a need for a communication system which is designed for high performance computing applications. For efficient enablement of the system there is a need for utilizing multiple technologies along with packaging methodologies. Further, to supplement the systems which are designed for high performance computing applications, there is a need for developing a high data rate communication mechanism both for inter-system communication and intra-system communication with thermal stability.

In the existing technologies, data processing and data transmission and reception at a high data rate requires complex hardware design, high power consumption and includes a lot of maintenance issues like heat dissipation, lower coupling efficiency etc. Further, high data rate processing needs to be coupled efficiently with high data rate transmission for smooth operation without delay and high efficiency.

To support higher data rate processing, to eliminate queue in transmission and/or reception optical communication techniques are introduced. Some major techniques used in optical communication includes Ring Modulator and Mach-Zehnder modulator (i.e. Silicon photonics). In some cases, there techniques are used along with PCB based assembly or TSI based assembly. However, the Ring Modulator and Mach-Zehnder modulator techniques introduce higher challenges to compact packaging. Also, these techniques consume significant power, contribute to significantly heat dissipation, and highly expensive.

Hence, there is a need for a system that complements higher data rate processing supported with higher data rate transmission and/or reception with compact packaging, lower power consumption, heat dissipation, available at low cost.

OBJECT OF THE INVENTION

The principal object of the invention is to achieve high data rate processing and transmission/reception. Accordingly, the main object of the present invention to provide systems and methods for enabling an optics based compute system associated with transmission and reception, to achieve high data rate processing and transmission/reception.

In one objective, the invention provides an optics based compute system associated with transmission of data and/or signals for communication, and a method for enabling the said optics based compute system associated with transmission. In another objective, the invention provides an optics based compute system associated with reception of data and/or signals for communication, and a method for enabling the said optics based compute system associated with reception.

Another key object is to design and provide hardware design for the above said systems and methods in computation and communication technology domain for data processing and communication.

Another object of the invention is to achieve higher packaging capacity through efficient optical and/or electrical interconnections.

Another object of the invention is to couple an electronic engine (i.e. processing) and an optical engine (i.e. transmission and/or reception) for high data rate operation at a significantly lower power consumption.

Another object of the present invention is to provide a system and method therefor that complements higher data rate processing supported with higher data rate transmission and/or reception with compact packaging, lower power consumption, heat dissipation, and available at low cost (cost effective), and at the same time it provides efficient data processing and communication system.

The above and other objects and characteristics of the present invention will become apparent from the further disclosure made in the paragraphs below and the detailed description of the specification described herein below.

SUMMARY OF THE INVENTION

The present invention describes systems and methods for enabling an optics based compute system associated with transmission and reception for data processing and communication.

Accordingly, in one aspect the invention provides an optics based compute system associated with transmission, wherein the system for transmission comprises: a first base layer; a first set of position pointers, wherein the first set of position pointers are connected directly on the first base layer to enable placement of a first electronic engine, a first plurality of power couplers, and a first optical engine; wherein the first electronic engine is connected with the first base layer, at a first position, via a first plurality of gold bumps; wherein each of the first plurality of the power couplers is connected with the first base layer, across the first electronic engine, via a first preform to provide effective power for the first electronic engine; wherein the first electronic engine enables generation of at least one electric signal; and wherein the first optical engine is connected with the first base layer, at a second position, via a second preform which enables to generate at least one optical signal and enables to configure transmission of the generated at least one optical signal.

The optics based compute system associated with transmission as described above, wherein the first electronic engine and the first optical engine are coupled via a first non-linear electrical connection, wherein the first non-linear connection comprises a ball bonding towards the first electronic engine and a wedge bonding at the first optical engine.

The optics based compute system associated with transmission as described above, wherein the first set of position pointers, comprises specific markings made in Gold, the first preform comprises a Tin-Silver-Copper layer (TSC layer), and the second preform comprises a Gold-Tin layer (GT layer).

The optics based compute system associated with transmission as described above, wherein the system is assembled and performed by: forming the first base layer with the first set of position pointers, wherein the first set of position pointers are connected directly on the first base layer to enable placement of the first electronic engine, first plurality of power couplers and first optical engine; forming the first plurality of gold bumps at the first position, wherein the first electronic engine is connected with the first base layer at the first position, forming the first preform, wherein the first plurality of the power couplers is connected with the first base layer, across the first electronic engine, via the first preform to provide effective power for the first electronic engine; wherein the first electrical engine is connected with the first base layer, via the first plurality of gold bumps to enable generation of at least one electrical signal; forming the second preform, wherein the first optical engine is connected with the first base layer, at the second position, via the second preform to obtain at least one electrical signal generated by the first electronic engine and configure transmission of the generated at least one optical signal; wherein the first electronic engine and the first optical engine are coupled via a non-linear electrical connection, wherein the non-linear connection comprises a ball bonding at the first optical engine and a wedge bonding towards the first electronic engine.

In another aspect, the invention provides an optics based compute system associated with reception, wherein the system for reception comprises: a second base layer; a second set of position pointers, wherein the second set of position pointers are connected directly on the second base layer to enable placement of a second optical engine, a second electronic engine, and a second plurality of power couplers; wherein the second optical engine is connected with the second base layer, at a third position, via a third preform to obtain/receive at least one transmitted optical signal and enables to configure reception of the transmitted at least one optical signal; wherein the second electronic engine is connected with the second base layer, at a fourth position, via a second plurality of gold bumps to enable generation of at least one electrical signal based on obtained at least one optical signal; and wherein each of the second plurality of the power couplers is connected with the second base layer, across the second electronic engine, via a fourth preform to provide effective power for the second electronic engine, wherein the second electronic engine enables generation of at least one electric signal.

The optics based compute system associated with reception as described above, wherein the second electronic engine and the second optical engine are coupled via a non-linear electrical connection, wherein the non-linear connection comprises a ball bonding towards the second electronic engine and a wedge bonding at the second optical engine.

The optics based compute system associated with reception as described above, wherein the second set of position pointers, comprises specific markings made in Gold, the third preform comprises a Gold-Tin layer (GT layer), and the fourth preform comprises a Tin-Silver-Copper layer (TSC layer).

The optics based compute system associated with reception as described above, wherein the system is assembled and performed by: forming a second base layer with a second set of position pointers, wherein the second set of position pointers are connected directly on the second base layer to enable placement of the second optical engine, the second electronic engine and the second plurality of power couplers; forming a third preform, wherein the second optical engine is connected with the second base layer, at the third position, via the third preform to configure reception of the transmitted at least one optical signal; forming the second plurality of gold bumps at the fourth position, wherein the second electronic engine is connected with the second base layer, via the fourth preform to enable generation of at least one electrical signal based on obtained at least one optical signal; and wherein each of the second plurality of the power couplers is connected with the second base layer, across the second electronic engine, via the fourth preform to provide effective power for the second electronic engine; wherein the second electronic engine and the second optical engine are coupled via a non-linear electrical connection, wherein the non-linear connection comprises a ball bonding towards the second electronic engine and a wedge bonding at the second optical engine.

In another aspect, the invention provides a method for enabling an optics based compute system associated with transmission as described above, wherein the method of transmission comprises the steps of: step 701: the compute system associated with transmission is configured to obtain at least one electrical signal generated by a first electronic engine; step 703: the compute system associated with transmission is configured to generate at least one optical signal based on the obtained at least one electrical signal generated using the first electronic engine; step 705: the compute system associated with transmission configures the generated at least one optical signal for transmission using the first optical engine associated with at least first set of position pointers; step 707: the compute system associated with transmission transmits the configured at least one optical signal.

The above described method for transmission, wherein the compute system for transmission comprises: a first set of position pointers, connected directly on the first base layer to enable placement of a first electronic engine, a first plurality of power couplers, and a first optical engine; wherein, the first set of position pointers, comprises specific markings made in Gold; a first preform to connect the first plurality of the power couplers with the first base layer, wherein the first preform comprises a Tin-Silver-Copper layer (TSC layer); a second preform to connect the first optical engine with the first base layer, wherein the second preform comprises a Gold-Tin layer (GT layer). In another aspect, the invention provides a method for enabling an optics based compute system associated with reception, wherein the method of reception comprises the steps of: step 801: the compute system associated with reception is configured to obtain at least one transmitted optical signal; step 803: the compute system associated with reception configures the obtained at least one optical signal using a second optical engine associated with at least one second set of the position pointers; step 805: the compute system associated with reception is configured to generate at least one electrical signal based on the configured at least one optical signal using a second electronic engine; step 807: the compute system associated with reception receives the generated at least one electrical signal generated in step 805.

The above described method for reception, wherein the compute system for reception comprises: a second set of position pointers connected directly on the second base layer to enable placement of a second optical engine, a second electronic engine, and a second plurality of power couplers; wherein the second set of position pointers, comprises specific markings made in Gold, a third preform to connect the second optical engine with the second base layer, wherein the third preform comprises a Gold-Tin layer (GT layer), a fourth preform to connect the second plurality of the power couplers with the second base layer, wherein the fourth preform comprises Tin-Silver-Copper layer (TSC layer).

This summary provided herein is to introduce a section of concepts in a simple and clear form which are further described in the detailed description of the invention along with reference to drawing figures. This summary provided herein is not intended to limit the determination of the scope of the claimed subject matter. The above summary is descriptive and exemplary only and is not intended to be in any way restricting. In addition to the descriptive aspects, embodiments, and features described in the above summary, further features and embodiments will become apparent by reference to the accompanied drawings and the following detailed description.

BRIEF DESCRIPTION OF DRAWINGS

The foregoing and any other features of embodiments will become more evident from the following detailed description of embodiments when read along with the associated drawings. In the drawings, like elements refer to like reference numerals.

In the following description, specific details are put forward in order to enable a thorough comprehension of various embodiments of the invention. However, it is evident to one skilled in the art that the embodiments of the invention may be put to practice with an equivalent arrangement or without using these specific details. In other examples, in order to avoid unnecessary obscuring of the embodiments of the invention, devices, and well-known structures are clearly shown in the form of a block diagram.

FIG. 2: illustrates generic block diagram and working of the compute system, associated with transmission or reception, according to one embodiment of the invention.

FIG. 3: illustrates diagram for construction and assembly of an optics based compute system associated with transmission, according to one embodiment of the invention.

FIG. 4: illustrates diagram for construction and assembly of an optics based compute system associated with reception, according to one embodiment of the invention.

FIG. 7: illustrates a flow chart for enabling construction and working method of the optics based compute system associated with transmission, according to one embodiment of the invention.

FIG. 8: illustrates a flow chart for enabling construction and working method of the optics based compute system associated with reception, according to one embodiment of the invention.

DETAILED DESCRIPTION OF THE INVENTION

Figure 1:
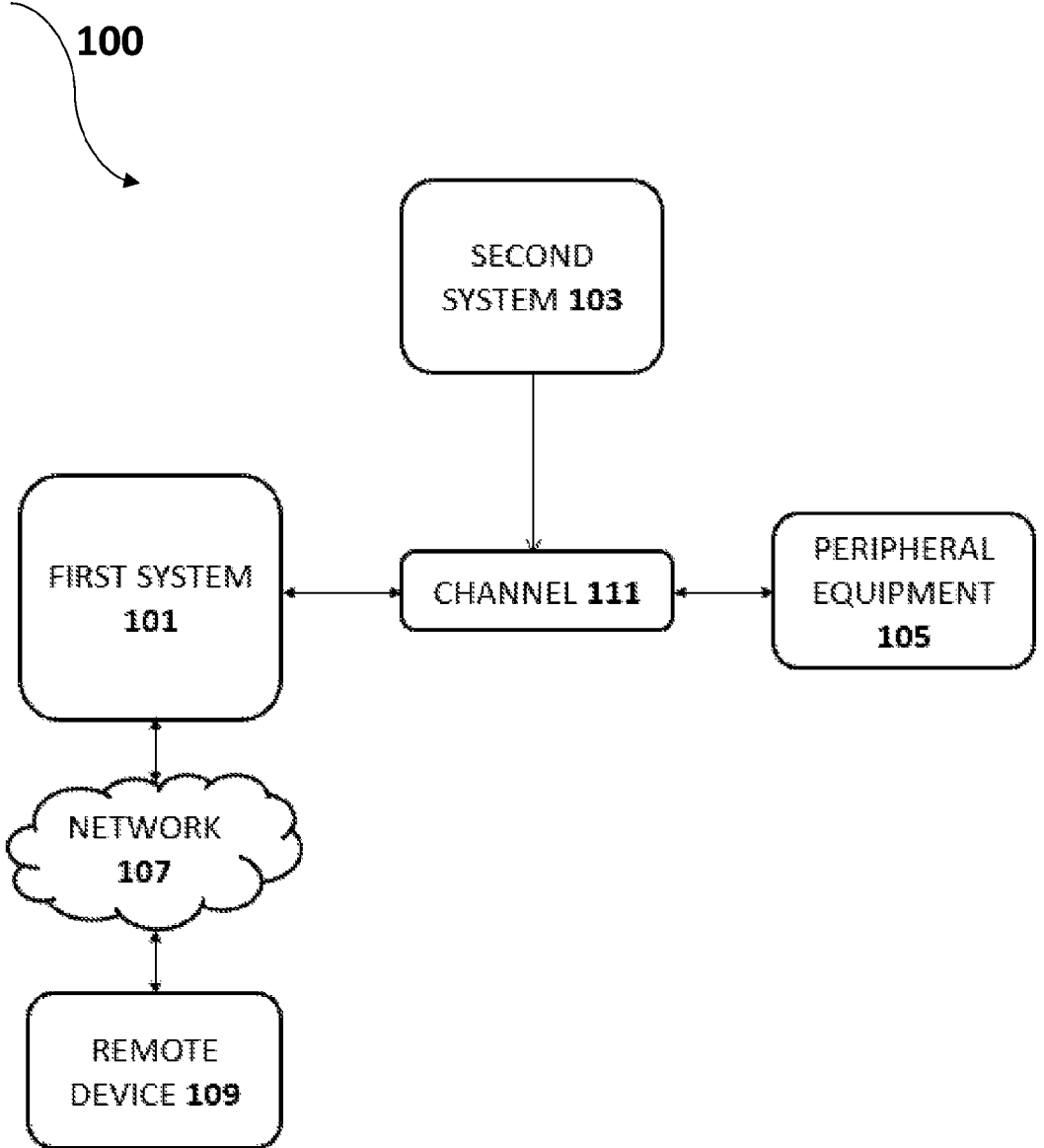
FIG. 1: illustrates network environment for enabling an optics-based compute system, according to one embodiment of the invention.

The present invention describes and provides systems and methods for enabling an optics based compute system associated with transmission and reception for data processing and communication.

To the enablement of the present disclosure and related ends, the at least one aspect comprises the feature(s) hereinafter completely described and particularly and/or specifically pointed out in the specification at the claim section. The above said drawings and description set forth below with reference to drawings in detail enable certain exemplary features of present invention. Described features are indicative, however, a few of the many ways in which the following principles of various aspects may be employed, and this description is intended to include all such aspects and their equivalents. The disclosed system solves the problem of computation coupled with transmission and/or reception associated with high data rate application with significant accuracy and at a low power consumption. Further, the system disclosed in the invention complements higher data rate processing supported with higher data rate transmission and/or reception with compact packaging, lower power consumption, heat dissipation, available at low cost. This is achieved by using efficient design, packaging, and coupling of the electronic engine, and an optical engine, using a plurality of fiducials, substrate, and power couplers.

Accordingly, systems and methods for enabling an optics based compute system associated with transmission and/or reception are described.

In one aspect, the invention provides an optics based compute system associated with transmission.

In another aspect, the invention provides an optics based compute system associated with reception.

In another aspect, the invention provides a method for enabling an optics based compute system associated with transmission.

In another aspect, the invention provides a method for enabling an optics based compute system associated with reception.

The above said systems and methods therefor of this invention, which are further described below in detailed, solve the problems of computation coupled with transmission and/or reception associated with high data rate application with significant accuracy and at a low power consumption.

The system for transmission and method therefor as described below, wherein method for enabling the optics based compute system associated with transmission involves a first compute system, which may comprise forming a first base layer with a first set of position pointers wherein the first set of position pointers are connected directly on the first base layer to enable placement of a first optical engine, a first electronic engine and a first plurality of power couplers. The system and method may also comprise forming a first plurality of gold bumps at a first position, such that the first electronic engine is connected with the first base layer of the first compute system.

The system and method enable generation of at least one optical signal based on at least one electric signal obtained from the first optical engine.

The system and method may also comprise forming a first preform. A plurality of first power couplers is connected with the first base layer, across the first electronic engine, via the said first preform to provide effective power for the first electronic engine.

The system and method may further comprise forming a second preform, such that the first optical engine is connected with the first base layer, at a second position, via the second preform to configure transmission of the generated at least one optical signal, wherein the first electronic engine and the first optical engine are coupled via a non-linear electrical connection, such that the non-linear connection comprises a ball bonding towards the first electronic engine and a wedge bonding at the first optical engine.

The first set of position pointers comprises specific markings made in Gold, the first preform comprises a Tin-Silver-Copper layer, the second preform comprises a Gold-Tin layer.

The system for reception and method therefor, wherein the method for enabling an optics based compute system associated with reception, the method may comprise forming a second base layer with a second set of position pointers, wherein the second set of position pointers are connected directly on the second base layer to enable placement of a second optical engine, a second electronic engine and a second plurality of power couplers.

The system and method may further comprise, forming a third preform, such that the second optical engine is connected with the second base layer, at a third position, via the third preform to configure reception of the transmitted at least one optical signal.

The system and method may further comprise, forming a second plurality of gold bumps at a fourth position, such that the second electronic engine is connected with the second base layer, and enable generation of at least one electrical signal based on obtained at least one optical signal. Each of the second plurality of the power couplers is connected with the second base layer, across the second electronic engine, via a fourth preform to provide effective power for the second electronic engine, wherein the second electronic engine and the second optical engine are coupled via a non-linear electrical connection, such that the non-linear connection comprises a ball bonding towards the second electronic engine and a wedge bonding at the second optical engine.

The second set of position pointers, comprises specific markings made in Gold, the third preform comprises a Gold-Tin layer and the fourth preform comprises a Tin-Silver-Copper layer, The above said systems and methods are further described in detailed with reference to drawing FIGS. 1-8 of present invention.

FIG. 1 illustrates a network environment, for enabling an optics based compute system associated with transmission and reception. Referring now to the drawings, FIG. 1 illustrates an environment (100) within which one or more reconfigurable and flexible modular compute system(s) for transmission and reception may be implemented. In one example embodiment as shown in FIG. 1, the environment (100) may include a first system (101), a second system (103), peripheral equipment (105), network (107), and remote user device (109) and channel (111). The shown two numbers of systems (101, 103) in FIG. 1 are exemplary in one embodiment to describe the present invention. In another embodiment, the network environment (100) may comprise a plurality of systems (101, 103, 105, . n) i.e. may be more than two systems connected via one or more ways of network connection(s) for communication and/or data processing.

In one embodiment, the systems (101, 103) are compute systems, and more preferably, the compute systems (101, 103) are modular compute systems.

Further the first modular compute system (101) may be communicatively coupled to the second modular system (103) through the channel (111). Throughout the disclosure the first modular compute system (101) may be the compute system associated with transmission and the second modular compute system (103) may be the compute system associated with reception. Further details regarding the compute system associated with transmission and reception may be explained in the later part of the disclosure. In an example embodiment, a peripheral equipment (105) may receive and/or send data through the channel (111) and may be connected to the network (107) via a first system (101). In some other example embodiments, the peripheral equipment (105) may be connected to the second system (103) via the channel (111). In some example embodiments, the second system (103) may also be connected with another remote device via another network. In some other example embodiments, the first system (101) and the second system (103) may also be connected via a network. In some example embodiments the input/out-put ports (I/O ports) on the compute systems (101,103) enabled communication via the channel (111). Peripheral devices may include but not limited to keyboard, mouse, touch screen, pen tablet, joystick, MIDI keyboard, scanner, digital, camera, video camera, microphone monitor, projector, TV screen, printer, plotter, speakers, external hard drives, media card readers, digital, camcorders, digital mixers, MIDI equipment and the like.

In some example embodiments, any of or both of the compute system (101/103) may be connected with the remote deice (109) via the network (107). The network (107) may include the Internet or any other network capable of communicating data between devices. Suitable networks may comprise or interface with any one or more for instance, a local intranet, a LAN (Local Area Network), a MAN (Metropolitan Area Network), a WAN (Wide Area Network), a PAN (Personal Area Network), a virtual private network (VPN), a MAN (Metropolitan Area Network), a frame relay connection, a storage area network (SAN), an Advanced Intelligent Network (AIN) connection, a synchronous optical network (SONET) connection, a digital EI, E3, T1 or T3 line, DSL (Digital Subscriber Line) connection, Digital Data Service (DDS) connection, an ISDN (Integrated Services Digital Network) line, an Ethernet connection, a dial-up port, for example such as a V.90, V.34 or V.34b is analog modem connection, an ATM (Asynchronous Transfer Mode) connection, a cable modem or CDDI (Copper Distributed Data Interface) connection or an FDDI (Fiber Distributed Data Interface). Furthermore, communications may also comprise links to any of a variety of wireless networks, comprising GPRS (General Packet Radio Service), WAP (Wireless Application Protocol), GSM (Global System for Mobile Communication), or CDMA (Code Division Multiple Access), TDMA (Time Division Multiple Access), cellular phone networks, CDPD (cellular digital packet data), RIM (Research in Motion, Limited), GPS (Global Positioning System), duplex paging network, Bluetooth radio, or an IEEE 802.11-based radio frequency network. The network (107) can further comprise or interface with any one or more of an RS-232 serial connection, a SCSI (Small Computer Systems Interface) connection, a Fiber Channel connection, an IEEE-1394 (Firewire) connection, an IrDA (infrared) port, a Universal Serial Bus (USB) connection or other connections which may be wired or wireless, and comprise digital or analog interface or connection, with mesh or Digi® networking.

In another example embodiment, hardware implementations which are specifically dedicated, such as application specific integrated circuits, programmable logic arrays, and many other hardware devices, can be built to implement numerous methods described hereafter. Applications may also include the apparatus of various embodiments can broadly include a variety of computer systems electronic boards. In more than one example, embodiments described hereafter may carryout functions using more than two specific devices with related control or interconnected hardware modules and data signals which can be transmitted and received between and through any of the modules, or as portions of an application-specific integrated circuit. Accordingly, the present system comprises of firmware, software, and hardware implementations.

In an example embodiment, the remote device (109) may be communicatively coupled to the system (101 and/or 103) via the network (107). In one example embodiment shown in FIG. 1, the first compute system (101) is shown connected with the remote deice (109) via the network (107). In some example embodiments, the remote devices are peripheral devices (109) which may include but not limited to mobile phone, laptops, desktops and the like. In some example embodiments, the remote device (109) may receive a plurality notification based on one or more functions associated with the system (101 and/or 103). In some example embodiments, peripheral remote device may be any circuitry to determine data integrity associated with the received optical signals. Throughout the disclosure compute system and optics based compute system may interchangeably be used.

Figure 2A:
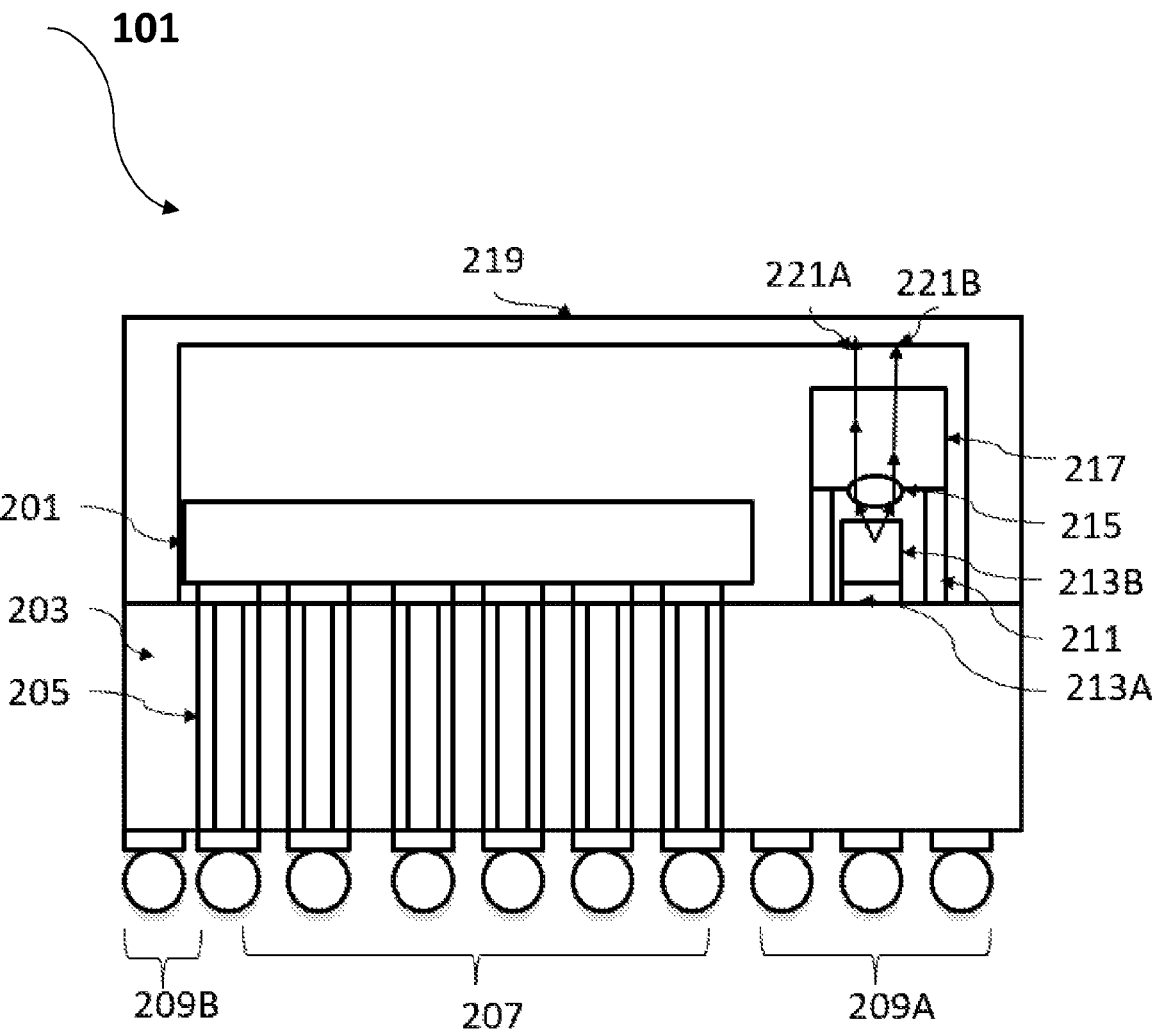
FIG. 2A: illustrates a generic block diagram of the compute system, associated with transmission or reception.

FIG. 2A illustrates a generic block diagram of the compute system (101), according to one embodiment of the invention. In some example embodiments, the block diagram of optical engine may also describe construction and assembly of the compute system (101) that enables high data rate connection between the multiple compute systems (101 and/or 103) is described herein. In some example embodiments, compute system (101) may be in two modes. Firstly, the "transmission mode" where the compute system (101) transmits optical signals. Secondly, the "reception mode" where the compute system (101) receives the optical signals. In some example embodiments, there may be a separate compute system (101) for transmission and a separate compute system (103) for reception.

In one exemplary embodiment to describe the present invention, the first compute system (101) is being considered for transmission and the second compute system (103) being considered for reception.

In some example embodiments, construction of the compute system (101) for transmission mode comprises a driver (201) placed on a substrate (203). The substrate (203) may be placed on any electronic circuitry using a first set of solder bumps (207). Through Silicon Vias (TS V) metallic contacts may be used for connecting the driver and the first set of solder bumps (207). A second set of solder bumps (209A and 209B) are connected to the electrical circuitry and the substrate to achieve alignment accuracy. Electrical signals generated by the driver (201) may be converted into optical signals using a LASER (213B) placed on an epoxy base (213A). The LASER (213B) is further supported by a lens (215) and a prism (217) placed on a support (211) which is connected to the substrate (203). The optical signals (i.e., 221A and 221B) emitted by the LASER (213B) are passed through the lens (215), the prism (217) and the transparent upper cover (219). In reception mode, a Trance Impedance Amplifier (TIA) replace the Driver (201) and a PIN diode replace the LASER (213B).

Figure 2B:
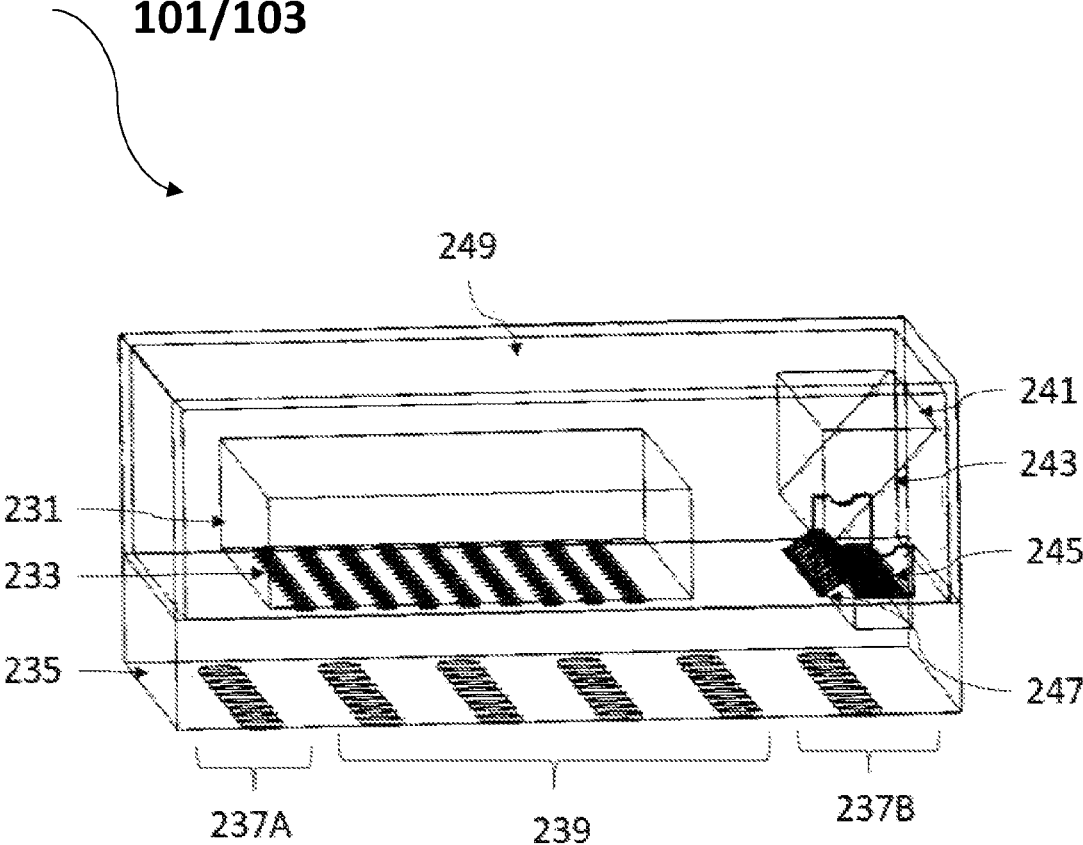
FIG. 2B: illustrates a generic working of the compute system, associated with transmission or reception.

FIG. 2B illustrates a generic working of the compute system (101) using an exemplary scenario, according to one embodiment of the invention. FIG. 2B illustrates operation of the compute system (101). A driver (231) is connected to a substrate (235) using electrical connections (233). In some example embodiments, the driver (231) and the substrate (235) may be the same as that explained in the FIG. 2A. As per instructions from a processor, the driver (231) triggers the LASER (247) through electrical connections (245), the first set of wire bonds (239) and the second set of wire bonds (237A and 237B). The triggered LASER (247) emits optical signals proportional to an input received from the driver (231). The emitted optical signal is primarily transmitted through an array of lens and then configured using a prism (241) comprising a beam aligner (243). In some example embodiments, the optical signal emitted from the array of lens may be configured based on various parameters inducing but not limited to alignment, travel distance etc using the beam aligner (243) of the prism (241). The optical signal configured by the prism (241) using the beam aligner (243) may be further transmitted through an upper cover (249). The upper cover (249) may be the same as that described in FIG. 2A.

In some example embodiments, during reception of optical signals the beam aligner (243) may be used for configuring precise reception of the optical signal which is later used to trigger an electrical signal proportional to the received optical signal. In some example embodiments, precise transmission and reception of the optical signals may be achieved by using at least one precision pointers.

Figure 3A:
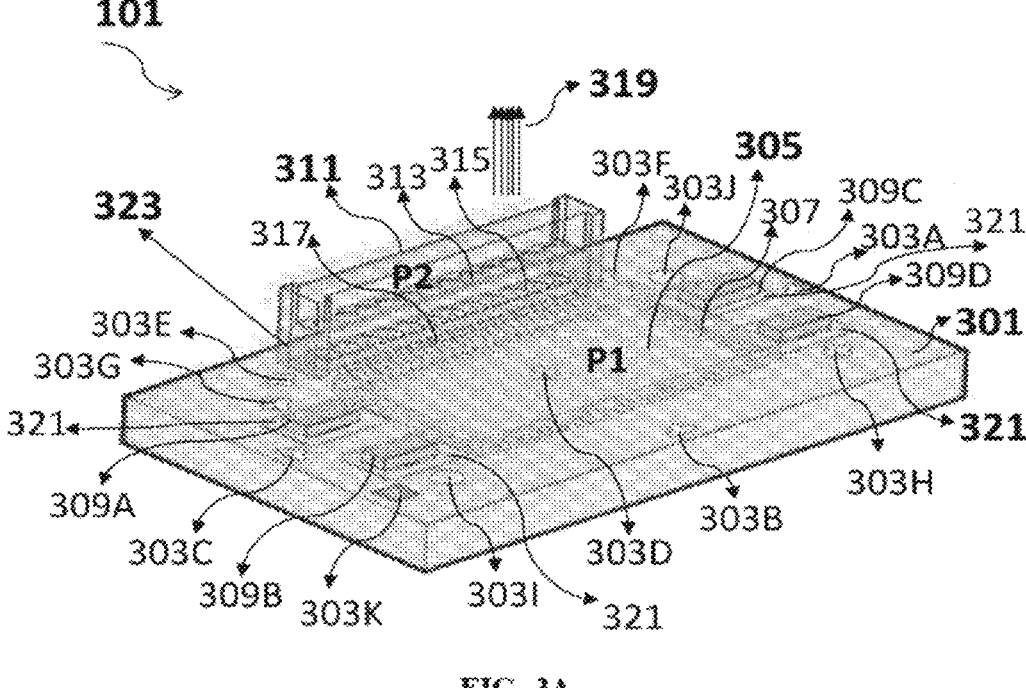
FIG. 3A: illustrates process for assembling the compute system associated with transmission.
Figure 3B:
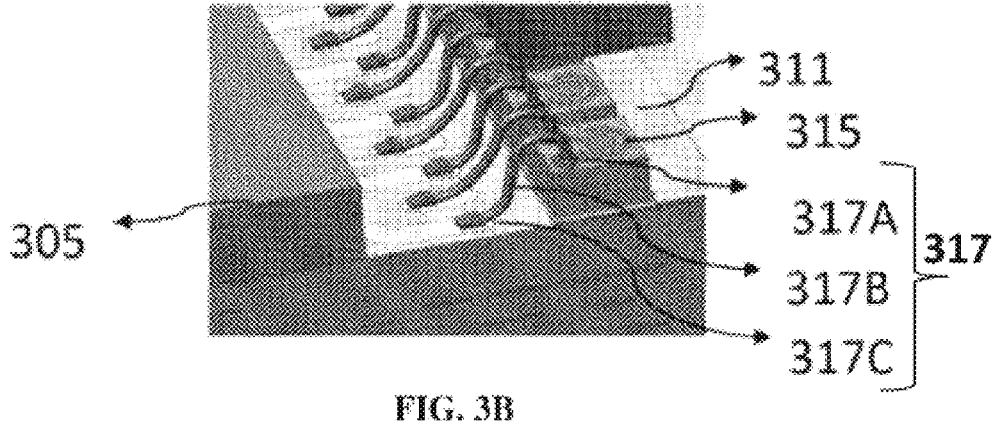
FIG. 3B: illustrates coupling between the first optical engine and the first electronic engine in the compute system of FIG. 3A.
Figure 4A:
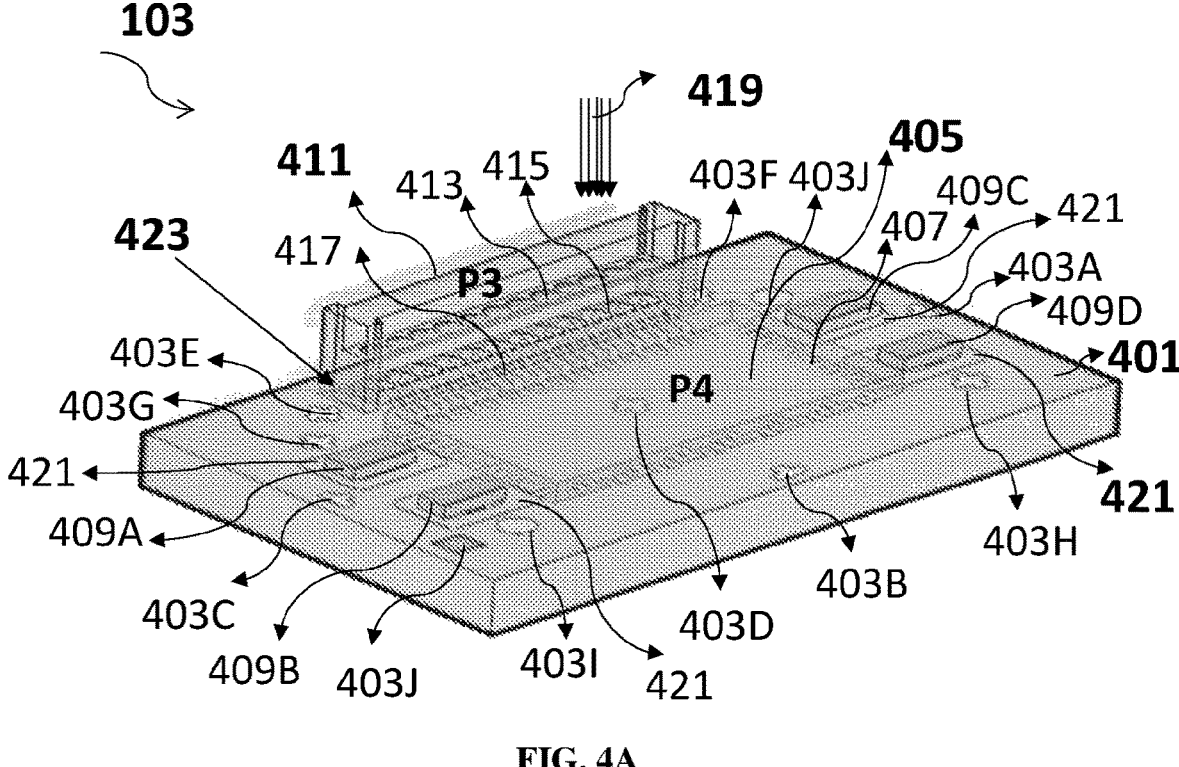
FIG. 4A: illustrates process for assembling the compute system associated with reception.
Figure 4B:
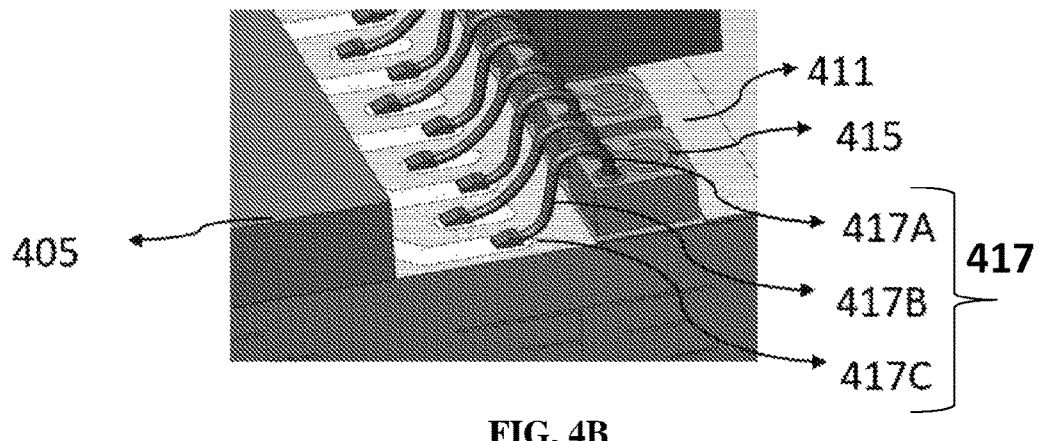
FIG. 4B: illustrates the coupling between the second optical engine and the second electronic engine in the compute system of FIG. 4A.

The process of assembling the compute system associated with transmission is explained in the FIGS. 3A-3B and the process of assembling the compute system associated with reception is explained in the FIGS. 4A-4B.

Referring FIG. 3A, the assembling of the FIRST COMPUTE SYSTEM (101) is shown and considered for explanation of transmission of data and/or signal according to the system and method of the present invention in one embodiment. As shown in FIG. 3A, the compute system (101) for transmission comprises a first base layer (301), a first plurality of position pointers (303), a first electronic engine (305), a first plurality of Gold bumps (307), a first plurality of power couplers (309), a first optical engine (311), a first set of lens array (313), a first vertical-cavity surface-emitting laser (VCSEL) array (315), a first a non-linear electrical connection (317), and a first optical signal (319).

As shown in figure, a first base layer (301) is formed. The first base layer (301) comprises embedded first set of position pointers (303). The first base layer (301) may be a multi-fold ceramic layer, in some example embodiments, a LTCC layer (Low Temperature Co-Fired Ceramic Layer), which is a type of material used in high frequency electronics. In some example embodiments, the multi-fold LTCC layer may comprise seven sub-layers and bottom sublayers comprises electrical connection and the topmost sublayer comprises the embedded position pointers (303). The position pointers are specific markings made of Gold. The position pointers (303) enable placement of various components on the first base layer (301). The placement of various components is explained in the further parts of the disclosure.

In some example embodiments, the position pointers (303) are of various types and placed on various positions on the first base layer (301) and the various position pointers are represented in the FIG. 3A using numerals (303A) to (303 K). The position pointers (303A), (303B), (303C) and (303D) enable placement of the first electronic engine (305), accurately with less than 0.1% tolerance. The position pointers (303E) and (303 F) enable placement of the first optical engine (311), accurately with less than 0.1 tolerance; and the position pointers (303G), (303H), (3031), and (303J) enable placement of the plurality of power couplers (309), accurately with less than 0.1% tolerance. The position pointer (303 K) enables placement of the optical engine and the plurality of power couplers with improved precision.

Further, the position pointers (303) are made of specific shapes to enable placement of the above-mentioned components. During fabrication, the position pointers are detected using a complementary metal oxide semiconductor (CMOS) sensor, in the above-mentioned order and respective component are placed. Use of the position pointers (303) increase the speed and accuracy of fabrication by three to four times.

In some example embodiments, along with the first set of position pointers (303) pins for connection of the electronic engine (305) is embedded, such that the first electronic engine (305) is placed on the pins using a first plurality of Gold bumps (307). In some example embodiments, the pins may be made of Gold and in some other example embodiments, copper towers may be used instead of Gold bumps. The electronic engine (305) may be accurately placed on the pins based on the thermos-compression bonding, whereas the thermos-compression bonding comprises heating the bottom portion of the electronic engine (305) comprising the first plurality of Gold bumps (307) to 350 degrees and the first base layer (301) comprising the pins may be heated to 200 degrees followed by application of pressure on the top portion of the electronic engine (305) to create Gold-Gold interface between the first electronic engine (305) and the first base layer (301). In some example embodiments, the gap formed between the first electronic engine (305) and the first base layer (301) may be filled using an under-fill material, which may include but not limited to cap-NCP that may be baked at 100 degrees. In accordance with an embodiment, the first electronic engine (305) is an Integrated Circuit (IC) which may comprise a processor that may be a 32-bit processors using a flat address space, such as a Hitachi SHI, an Intel 960, an Intel 80386, a Motorola 68020 (or any other processors carrying similar or bigger addressing space). Processors other than the above mentioned, processors that may be built in the future, are also apt. The processor can include but is not limited to general processor, Application Specific Integrated Circuit (ASIC), Digital Signal Processing (DSP) chip, AT89S52 microcontroller firmware or a combination, Field Programmable Gate Arrays (FPGAs) thereof.

Processors which are suitable for carrying out a computer program may include, by example, both special and general-purpose microprocessors, or processors of any kind for digital computer. Generally, a processor obtains instructions and data through a read only memory card or a random-access memory (RAM) or both. The vital elements of a computer are its processor for carrying out instructions and multiple memory devices for hoarding data and instructions. Generally, a computer includes, or be operatively associated to transfer data to or receive data from, or both, multiple mass storage devices for hoarding data, e.g., magneto optical disks, magnetic, or optical disks. However, a computer requires no such devices. Moreover, a computer can be lodged into another device without much effort, e.g., a personal digital assistant (PDA), a mobile telephone, a GPS receiver, a mobile audio player, to name a few. Computer readable media which are suitable for hoarding computer programs and data consists of all forms of media, and memory devices, nonvolatile memory, including semiconductor memory devices, e.g., EEPROM, EPROM, and magnetic disks, flash memory devices; e.g., removable disks or internal hard disks; magneto optical disks, DVD-ROM disks and CD ROM. The memory can be of non-transitory form such as a RAM, ROM, flash memory, etc. The processor along with the memory can be supplemented by, or subsumed in, special purpose logic circuits.

In accordance with an example embodiment, the electronic engine (305) may also comprise the memory that includes both static memory (e.g., ROM, CD-ROM, etc.) and dynamic memory (e.g., RAM, magnetic disk, writable optical disk, etc.) for hoarding the executable instructions which when executed perform sampling of the electronics signals to generate optical signals or vice-versa.

In some example embodiments, each of the first plurality of the power couplers (309) is connected with the first base layer (301), across the first electronic engine (305). As illustrated in the FIG. 3A, the first plurality of power couplers (309 A) to (309D) provide effective power for the first electronic engine (305). In some example embodiments, the power couplers (309 A) to (309D) being capacitors of specific capacity, they regulate the variation in the supplied power towards the electronic engine (305). The connection between the respective power couplers (309 A) to (309D) and the first base layer (301) is made using a first preform (321), as illustrated in the FIG. 3A. The first preform (321)

may be a Tin-Silver-Copper (i.e., AgSnCu) layer. The power couplers (309) placed on the Tin-Silver-Copper layer (321) are heated to 310 degrees C. to get attached with the first base layer (301).

In some example embodiments, the first optical engine (311) is connected with the first base layer (301), using a second preform (323) (not shown in figure). The second preform (323) comprising the first optical engine (311) is heated to 350 degrees C. to attach to the first base layer (301). In some example embodiments, the second preform (323) may be a Gold-Tin (i.e., AuSn) layer. In some example embodiments, the first optical engine (311) basically comprises a VCSEL array (315) associated with a first set of lens array (313). The VCSEL array (315) of the first optical engine (311) is coupled to the first electronic engine (305), such that the VCSEL array (315) associated with a first set of lens array (313), produces at least one optical signal (319) proportional to the at least one electronic signal generated from the first electronic engine (305). Connection between the VCSEL array (315) of the first optical engine (311) and the first electronic engine (305) is explained in the FIG. 3B.

FIG. 3B illustrates coupling between the first optical engine (311) and the first electronic engine (305). The first electronic engine (305) and the first optical engine (311) are coupled via a first non-linear electrical connection (317), such that the non-linear connection (317) comprises a ball bonding (317A) towards the first electronic engine (305) and a wedge bonding (317C) at the first optical engine (311). Further, it may be observed that the ball bonding (117A) is made on the VSCEL array (315) of the first optical engine (311) and via a wire (317B) the connection is made towards the first electronic engine (305). It may also be observed that the connection is non-linear (zig-zag) in nature. Also, the ball bonding (317A) at the VSCEL array (315) of the first optical engine (311) is coupled with the first electrical engine (305) through the wedge bonding (317C), that is made on the first base layer (301) and through internal electrical connection, the first base layer (301) is connected with the first electrical engine (305). Further, both the ball bonding (317A) and the wedge bonding (317C) are present on two opposite ends of the wire (317B). In this case, the nonlinear connection increases the coupling efficiency by limiting the space constraint for electrical connection between the first electronic engine (305) and the first optical engine (311). In some example embodiments, the first electrical engine (305) drives the VSCEL array (315) of the first optical engine (311) to generate at least one first optical signal proportional to the at least one first electrical signal, next the generated first optical signal is coupled though a channel, using a first lens array (313).

Referring FIG. 4A, the assembling of the SECOND COMPUTE SYSTEM (103) is shown and considered for explanation of reception of data and/or signal according to the system and method of the present invention in one embodiment. As shown in FIG. 4A, the second compute system (103) for reception comprises a second base layer (401), a second plurality of position pointers (403), a second electronic engine (405), a second plurality of Gold bumps (407), a second plurality of power couplers (409), a second optical engine (411), a second set of lens array (413), a photodiode (PD) array (415), a second a non-linear electrical connection (417), and a second optical signal (419).

As shown in figure, a second base layer (401) is formed. The second base layer (401) comprises embedded second set of position pointers (403). The construction and working of the second base layer (401) and the second set of position pointers (403) are identical to that of the first base layer (301) and the first set of position pointers (303) respectively. In some example embodiments, there may exist position pointer (403), that differentiates whether the compute system is configured for transmission or reception. Various components are placed on the second base layer (401). The placement of various components is explained in the further parts of the description below.

In some example embodiments, the position pointers (403) are of various types and placed on various positions on the second base layer (401) and the various position pointers are represented in the FIG. 4A using numerals (403A) to (403 K). The position pointers (403A), (403B), (403C), and (403D) enable placement of the second electronic engine (405), accurately with less than 0.1% tolerance. The position pointers (403E) to (403F) enable placement of the optical engine (411), accurately with less than 0.1% tolerance and the position pointers (403G), (403H), (4031), and (403J) enable placement of the second plurality of power couplers (409A-409D), accurately with less than 0.1% tolerance. The position pointer (403 K) enables placement of plurality of optical engine and power couplers with improved precision.

In some example embodiments, along with the second set of position pointers (403) pins for connection of the second electronic engine (405) is embedded, such that the second electronic engine (405) is placed on the pins using a second plurality of Gold bumps (407). Construction of the second electronic engine (405) and the second plurality of Gold bumps (407) of FIG. 4A are identical to that of the first electronic engine (305) and the first plurality of Gold bumps (307) of FIG. 3A. In accordance with an embodiment, the second electronic engine (405) is an Integrated Circuit (IC) which comprises processor and/or memory similarly as described for the first electronic engine (305). However, configuration of the second electronic engine (405) is different than that of the first electronic engine (305) which is further described in later part of this description.

In some example embodiments, each of the second plurality of the power couplers (409) is connected with the second base layer (401), across the second electronic engine (405), using a fourth preform (421) as illustrated in the FIG. 4A. The construction and working of the second plurality of power couplers (409) is identical to that of the first plurality of power couplers (309) and the fourth preform (421) is identical to the first preform (321).

In some example embodiments, the second optical engine (411) is connected with the second base layer (401), using a third preform (423) (not shown in figure). The construction and working of the second optical engine (411) differ slightly from that of the first optical engine (311). However, the third preform (423) is identical to that of the second preform (323). In some example embodiments, the second optical engine (411) basically comprises a Photodiode array (415) (i.e., PD array) associated with a second set of lens array (413). The PD array (415) of the second optical engine (411) is coupled to the second electronic engine (405), such that the PD array (415) associated with the second set of lens array (413), receives at least one optical signal (419) and the second electronic engine (405) generates at least one electronic signal proportional to the of the received at least one optical signal (419). Connection between the PD array (415) of the second optical engine (411) and the second electronic engine (405) is explained in the FIG. 4B.

FIG. 4B illustrates the coupling between the second optical engine (411) and the second electronic engine (405). The second electronic engine (405) and the second optical engine (411) are coupled via a non-linear electrical connection (417), such that the non-linear connection (417) comprises a ball bonding (417A) towards the first electronic engine (405) and a wedge bonding (417C) at the second optical engine (411). Further, it may be observed that the ball bonding (417A) is made on the PD array (415) of the second optical engine (411) and via a wire (417B) the connection is made towards the second electronic engine (405). It may also be observed that the connection is non-linear (zig-zag) in nature. Also, the ball bonding (417A) at the PD array (415) of the second optical engine (411) is coupled with the second electrical engine (405) through the wedge bonding (417C), that is made on the second base layer (401) and through internal electrical connection, the second base layer (401) is connected with the second electrical engine (405). Further, both the ball bonding (417A) and the wedge bonding (417C) are present on two opposite ends of the wire (417B). In this case, the non-linear connection increases the coupling efficiency by limiting the space constraint for electrical connection between the second electronic engine (405) and the second optical engine (411). In some example embodiments, the second electrical engine (405) drives the PD array (415) of the second optical engine (411) to generate at least one second electrical signal proportional to the received at least one second optical signal (419), received through the channel, using a second lens array (413).

In some example embodiments, it may be observed that the non-linear connection (317) associated with the first modular compute system associated with transmission (101) and the non-linear connection (417) associated with the second modular compute system associated with reception (103) are identical except for that fact that: firstly, a) the nonlinear connection (317) associated with the modular compute system associated with transmission (101) comprises the ball bonding (317A) on the VSCEL array (315) and the nonlinear connection (417) associated with the modular compute system associated with reception (103) comprises the ball bonding (417A) on the PD array (415); and secondly, b) in the modular compute system associated with transmission (101) the first electronic engine (305) drives that VSCEL array (315) of the first optical engine (311) to generate at least one optical signal (319) proportional to the at least one first electrical signal generated by the first electrical engine (305), whereas in the modular compute system associated with reception (103) the second electronic engine (405) drives that PD array (415) of the second optical engine (411) to generate at least one second electrical signal proportional to the received at least one second optical signal (419). In this case, the transmitted at least one first optical signal (319) is the same the received at least one second optical signal (419) and the least one first electrical signal at the side of the modular compute for transmission (101) is the same the at least one second electrical signal generated at the side of the modular compute for reception (103).

Figure 5:
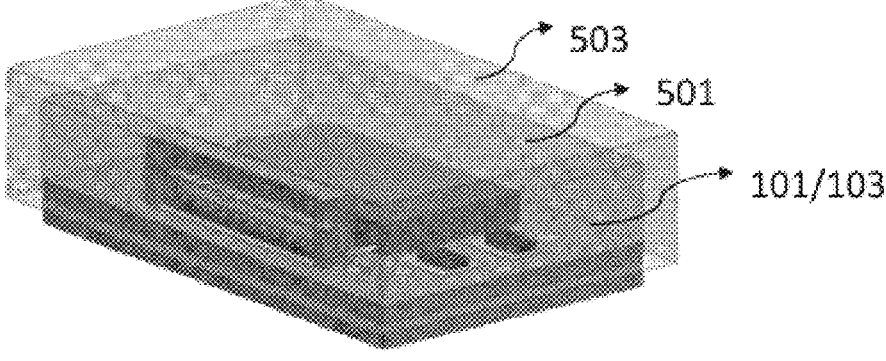
FIG. 5: illustrates a diagram for housing of an optics based compute system associated with transmission/reception, according to one embodiment of the invention.

FIG. 5 illustrates a diagram for housing of an optics based compute system associated with transmission/reception (101/103), according to one embodiment of the invention. The compute system associated with transmission/reception (101/103) may be placed inside a transparent casing (i.e., a glass cover) that comprises an outer end (503) and an inner end (501), over the compute system associated with transmission/reception (101/103). The compute system associated with transmission/reception (101/103) is accurately placed in hollow of the inner end (501), as shown in the FIG. 5. Also, the inner end (501) is for providing protection for the various components present on the compute system associated with transmission/reception (101/103) and the outer end (503) enables modular placement of the compute system associated with transmission/reception (101/103). Further, both the inner end (501) and the outer (503) are made up of UV epoxy material with a refractive index of air. Any channel (i.e., III of FIG. 1) may be located over the outer end (503). In some example embodiment, a glass structure may be molded to form a glass cover comprising a hollow inner end (501) and a solid outer end (503) as shown in the FIG. 5.

Figure 6:
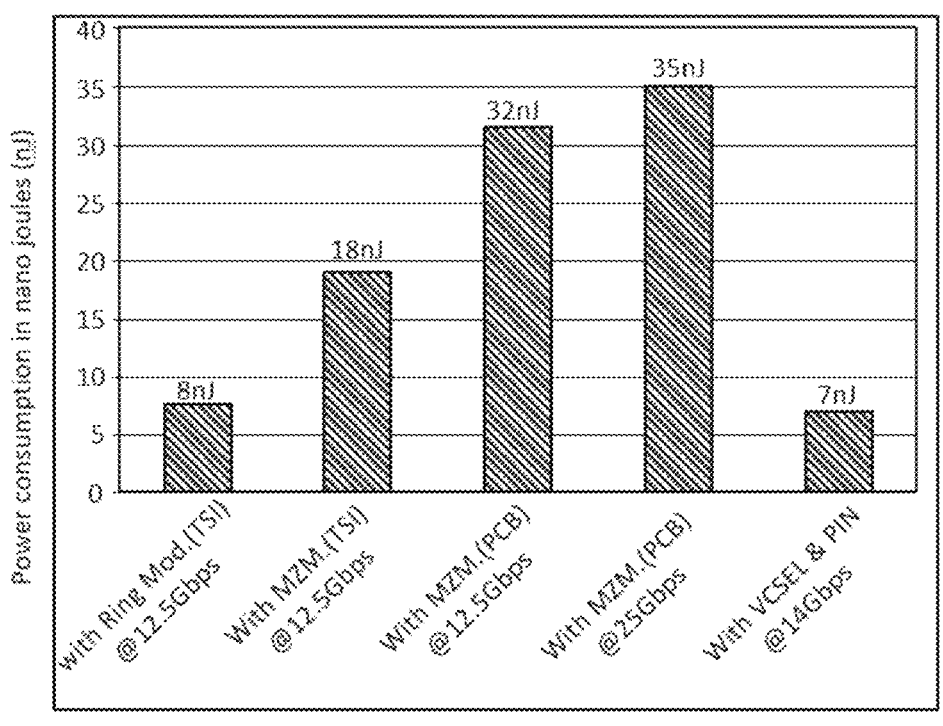
FIG. 6: shows a graph comparatively showing the power consumption during higher data rate transmission/reception in the case of known conventional system and in the system and/or method according to one embodiment of the invention.

FIG. 6 illustrates a graph for illustrating power consumption during higher data rate transmission in the case of known conventional system, and in the system and/or method according to one embodiment of the invention. In the graph, various silicon photonics technologies may be observed and their respective power consumption during higher data rate transmission/reception may be noted. In electrical interconnections power consumed would be in the range of 90 to 100 nano joules, however silicon photonics-based communications have power consumption in nano joules (nJ) and the system and method disclosed in the disclosure is comparable with silicon photonics and power consumption in the disclosed system and method is lower compared to existing technology.

Further, the graph illustrates Ring modulator technology in Through Silicon via system having data rate of 12.5 Gbps consumes 8 Nano joules of power. Mach-Zehnder modulator technology in Through Silicon via system having data rate of 12.5 Gbps consumes 18 Nano joules of power. Mach-Zehnder modulator technology in a PCB system having data rate of 12.5 Gbps consumes 32 Nano joules of power. Mach-Zehnder modulator technology in a PCB system having data rate of 25 Gbps consumes 35 Nano joules of power. However, the system and method disclosed in the disclosure consumes only 7 Nano joules of power for data transmission at 14 Gbps. Higher data rate transmission at lower power consumption is achieved through compact packaging, design elements and efficient optical coupling.

In another aspect, the invention provides a method for enabling an optics based compute system associated with transmission.

FIG. 7 illustrates a flow chart for enabling construction and working method of the optics based compute system associated with transmission, according to one embodiment of the invention. In one embodiment, the flow chart of FIG. 7 illustrates the transmission mode of the first modular compute system (101) for transmitting the first optical signal (319) which is generated by the first optical engine (311) by using/converting the obtained electrical signal received by the first optical engine (311) from the first electrical engine (305) via the first a non-linear electrical connection (317) as described in FIGS. 3A-3B.

In one example embodiment of the transmission method, the at least one electrical signal generated by the first electrical engine (305) drives the VSCEL array (315) of the first optical engine (311) to generate at least one first optical signal (319) proportional to the at least one first electrical signal generated by the first electrical engine (305). The thus generated first optical signal (319) in next step, is coupled though a channel, using a first lens array (313) and transmitted to the destination for example another second compute system (103) wherein the transmitted first optical signal (319) is received by said another second compute system (103) and therein converted into electrical signal by said another second optical engine (411) which is further described in FIGS. 4A-4B and illustrated in FIG. 8.

The method of generation and transmission of data/signal by the compute system (101) comprises following steps (701-707):

In accordance with an embodiment, at step 701 the compute system associated with transmission (101) may be configured to obtain at least one electrical signal generated by a first electronic engine (305). In accordance with an embodiment, at step 703 the compute system associated with transmission (101) may be configured to generate at least one optical signal (319) based on the obtained at least one electrical signal, generated using the first electronic engine (305). The said first optical signal (319) is generated using the driver IC and the VSCEL array (LASER).

In accordance with an embodiment, at step 705 the compute system associated with transmission (101) may configure the generated at least one optical signal (319) for transmission using, the first optical engine (311) associated with at least first set of position pointers.

In accordance with an embodiment, at step 707 the compute system associated with transmission (101) may transmit the configured at least one optical signal (319), which is transmitted to the destination for example another second compute system (103) communicatively connected within the network environment (100).

At the destination, the transmitted first optical signal (319) is received by said another second compute system (103) which optical signal (319) is referred at the destination as the second optical signal (419) which is received and converted back into electrical signal by another second optical engine (411). Thus, electrical signal generated from optical signal is received by the second compute system (103) which is further described in FIGS. 4A-4B and illustrated in FIG. 8.

In fourth aspect, the invention provides a method for enabling an optics based compute system associated with reception.

FIG. 8 illustrates a flow chart for enabling construction and working of the optics based compute system associated with reception, according to one embodiment of the invention. In one embodiment, the flow chart of FIG. 8 illustrates the reception mode of the compute system (103) for receiving the second optical signal (419) and converting into electrical signal by an optical engine.

Here, the first optical signal (319) transmitted by the first compute system (101), which is received by the second compute system (103) is considered as second optical signal (419). Thus, transmitted first optical signal (319) of FIG. 3A=received second optical signal (419) of FIG. 4A.

In one example embodiment of the reception method, the second optical engine (411) basically comprises a Photodiode array (415) (i.e., PD array) associated with a second set of lens array (413). The PD array (415) of the second optical engine (411) is coupled to the second electronic engine (405), such that the PD array (415) associated with the second set of lens array (413), receives at least one optical signal (419) and the second electronic engine (405) generates at least one electronic signal proportional to the of the received at least one optical signal (419). In this way first optical signal (319) transmitted by the first compute system (101) is received as the second optical signal (419) at second compute system (103) and converted into electrical signal.

The method of reception and conversion of data/signal by the compute system (103) comprises following steps (801-807):

In accordance with an embodiment, at step 801 the compute system associated with reception (103) may be configured to obtain at least one transmitted optical signal (419). The at least one transmitted optical signal (419) is the at least one optical signal (319) transmitted by the first system (101) which is received as optical signal (419) by the second compute system (103).

In accordance with an embodiment, at step 803 the compute system associated with reception (103) may configure the obtained at least one optical signal (419) using a second optical engine (411) associated with at least one second set of the position pointers.

In accordance with an embodiment, at step 805 the compute system associated with reception (103) may be configured to generate at least one electrical signal based on the configured at least one optical signal (419) using a second electronic engine (405).

In accordance with an embodiment, at step 807 the compute system associated with reception (103) may receive the generated at least one electrical signal. In this step, the electrical signal as generated from the transmitted obtained optical signal (419) in step 805 is received. Issue associated with design and packaging includes high frequency transmission lines require larger spacing between traces and Optical Parts have small dimensions. In one embodiment of the present invention, such issue is addressed by making the trace lengths equal to avoid synchronization problems which may require design optimization.

Further, power consumption and heat dissipation challenges are addressed by isolating the electronic engine (405/305) and the optical engine (311/411). In one embodiment, the signal cross-talk between channels and the reflection losses at trace bends need to be minimized through ground isolation or filtering. This imposes restriction on how the traces are formed. The wire bond loop is acting like an antenna at high frequencies and losses need to be included in the attenuation budget.

Reliability of component is critical as multiple technologies are integrated in a single package. In order to address this particular issue, in one embodiment, the design of the compute system(s) and method of present invention incorporates many materials like GaAs, Si, SiGe, AuSn, SnAgCu, UV epoxy, acrylic and Ceramics like Alumina. The connections are Gold and Aluminum. The under fill is an organic component. These materials have largely diverse characteristics like Young's Modulus, CTE, and Poisson Constant. Reliability is dependent on materials, processes, and operation conditions. These are studied extensively, and process optimized for long life of product.

In some example embodiments, the assembly process flow becomes more complex as the gap between electronic engine (305/405) and VCSEL array (315) or PD array (415) is very small, hence the assembly process, is designed to reduce signal attenuation. Further, each of the materials have different melting temperature. Hence, the plurality of gold bumps and/or gold wire bond is executed on the first base layer (301) or the second base layer (401), followed by AuSn solder at 350C, SnAgCu at 300C and UV epoxy at 120C, which indicates order of assembly includes VCSEL array (315) or PD array (415) first, followed by the electronic engine (405/305), followed by capacitors (307/407), followed by optical engine (311/411) and the outer cover. Hence, the VCSEL array (315) cannot be tested independently, therefore testing of the VCSEL array (315) is coupled with an independent test set up.

In some example embodiments, the form factor (i.e., dimensions) of the various components may be described below:

| Component name | Dimension (l*b*h) |
|---|---|
| Compute system associated with transmission and/or reception | 6.4-6.6*3.9-4.1*0.6-0.8 (in mm) |
| First base layer/second base layer/multi-layer ceramic | 6.3-6.7*4.7-4.9*0.6-0.8 (in mm) |
| First electronic engine/second electronic engine/IC | 3.71-3.73*2.0-2.1*0.24-0.26 (in mm) |
| First optical engine/second optical engine/VCSEL array | 2.88-3.08*0.27-0.29*0.13-0.15 (in mm) |
| Each of first set of position pointers/second set of position pointers/Gold bumps | 55 μm (in dia) |
| Second preform/Third preform/ Gold-Tin layer | 3.06-03.1*0.37-0.39*0.004-0.006 (in mm) |
| First preform/Fourth preform/ Tin-Silver-Copper layer | 0.22-0.24*0.19-0.21*0.009-0.011 (in mm) |
| Wire bonding (Ball bonding and Wedge bonding) | 1.2 mili-inches in dia |
| Volume of inner end of the glass cover | 30-32 mm$^3$ |
| Volume of outer end of the glass cover | 62-63 mm$^3$ |

Further, the other associated advantages of the invention over existing technologies explained in terms of operation, designing and set up complexities are as below.

The "small form" factor of the compute system associated with transmission and/or reception (101/103), and of all the components of the compute system associated with transmission and/or reception (101/103) enable low power dissipation, higher integration of components on a chip and economic significance as the chip with higher integration can perform tasks of multiple chips and resources required for large scale manufacture is significantly reduced.

In some example embodiments, method of enabling the optics-based compute system for transmission and/or reception includes discrete component-based assembly for each of the components placed on the optics-based compute system for transmission and/or reception. The discrete component-based assembly eliminates complexity of the microelectromechanical system (MEMS) process used in assembly of components in silicon-based technology. Throughout the disclosure, discrete component-based assembly includes individual placement of each of the components with high degree of control, accuracy and minimum complexity, resources, and expenses. In some example embodiments, the optics-based compute system for transmission and/or reception is coupled with free space transmission and/or reception. Also, in some example embodiments, the optics-based compute system for transmission and/or reception is coupled with multi-mode optical fiber, unlike other single mode optical fiber-based transmission and/or reception. Coupling of free space communication or multi-mode optical fiber communication eliminates all sorts of miss alignments including but not limited to position misalignment, angular misalignment etc. Further, use of multi-mode and/or free space communication involves significantly less installation expenditure, operational expenditure, and maintenance cost. Furthermore, elimination of process of modulation that is used in the single mode fiber that works under principles of Electromagnetic theory, has made the system most robust and less susceptible to environmental condition, heat dissipation and high-speed communication. Also, unconfined mode of transmission and reception using free space or multi-mode optical fiber is cheaper with respect to capital expenditure, operational expenditure, engineering time and design complexity, compared to confined mode of transmission and reception used in other technologies. Based on the observed advantages of the invention, a particular configuration of transmission and/or reception (i.e. 200 Gbps) may be achieved at half of the cost, observed over other existing technologies.

The above detailed description includes description of the invention in connection with a number of embodiments and implementations. The invention is not limited by the number of embodiments and implementations but covers various obvious modifications and equivalent arrangements which lie within the purview of the appended claims. Though aspects of the invention are expressed in certain combinations among the claims, it is considered that these features may be arranged in any combination and order. The specification and accompanied drawings are to be contemplated in an illustrative and exemplary rather in limiting sense.

We claim:

1. An optics based computing system associated with transmission of at least one optical signal, wherein the optics based computing system comprising:
a first base layer;
a first electronic engine connected to the first base layer;
a first plurality of power couplers connected to the first base layer;
a first optical engine connected to the first base layer; and
a first set of position pointers, wherein
the first set of position pointers are connected directly on the first base layer to enable placement of each of:
the a first electronic engine,
the a first plurality of power couplers, and
the a first optical engine,
the first electronic engine is connected to the first base layer, at a first position (PI), via a first plurality of gold bumps,
each of the first plurality of the power couplers is connected to the first base layer, across the first electronic engine, via a first preform to provide effective power for the first electronic engine,
the first electronic engine is configured to generate at least one electric signal,
the first optical engine is connected to the first base layer, at a second position, via a second preform, and
the first optical engine is configured to:
generate the at least one optical signal based on the at least one electric signal; and
transmit the generated at least one optical signal.

2. The optics based computing system associated with the transmission of the at least one optical signal as claimed in claim 1, wherein the first electronic engine and the first optical engine are coupled via a first non-linear electrical connection, and the first non-linear electrical connection comprises a ball bonding towards the first electronic engine and a wedge bonding at the first optical engine.

3. The optics based computing system associated with the transmission of the at least one optical signal as claimed in claim 1, wherein
the first set of position pointers, comprises specific markings made in Gold,
the first preform comprises a Tin-Silver-Copper layer (TSC layer), and
the second preform comprises a Gold-Tin layer (GT layer).

4. The optics based computing system associated with the transmission of the at least one optical signal as claimed in claim 1, wherein the system is assembled and performed by:
forming the first base layer with the first set of position pointers, wherein the first set of position pointers are on the first base layer to enable the placement of each of the first electronic engine, the first plurality of power couplers, and the first optical engine;

forming the first plurality of gold bumps at the first position, wherein the first electronic engine is connected to with the first base layer at the first position, forming the first preform, wherein the first plurality of the power couplers is connected to the first base layer, across the first electronic engine, via the first preform to provide the effective power for the first electronic engine, and the first electrical engine is connected with the first base layer, via the first plurality of gold bumps to enable the generation of the at least one electrical signal; and forming the second preform, wherein the first optical engine is connected to the first base layer, at the second position, via the second preform to obtain at least one electrical signal generated by the first electronic engine and configure the transmission of the generated at least one optical signal, the first electronic engine and the first optical engine are coupled via a non-linear electrical connection, and the non-linear electrical connection comprises a ball bonding at the first optical engine and a wedge bonding towards the first electronic engine.

5. The optics based computing system associated with the transmission of the at least one optical signal as claimed in claim 2, wherein the first non-linear electrical connection further comprises a wire, a first end of the wire corresponds to the ball bonding, and a second end of the wire corresponds to the wedge bonding.

6. The optics based computing system associated with the transmission of the at least one optical signal as claimed in claim 2, wherein the first non-linear electrical connection connects the first electronic engine and the first optical engine in a zig-zag arrangement.

7. An optics based computing system associated with reception of at least one optical signal, wherein the optics based computing system comprising:

a second base layer;

a second optical engine connected to the second base layer;

a second plurality of power couplers connected to the second base layer;

a second electronic engine connected to the second base layer; and a second set of position pointers, wherein the second set of position pointers are on the second base layer to enable placement of each of:
the second optical engine,
the second electronic engine, and
the second plurality of power couplers, the second optical engine is connected to the second base layer, at a third position, via a third preform to receive the at least one optical signal, the second electronic engine is connected to the second base layer, at a fourth position, via a second plurality of gold bumps to generate at least one electrical signal based on the received at least one optical signal, each of the second plurality of the power couplers is connected to the second base layer, across the second electronic engine, via a fourth preform to provide effective power for the second electronic engine, and the second electronic engine is configured to generate the at least one electric signal.

8. The optics based computing system associated with the reception of the at least one optical signal as claimed in claim 7, wherein the second electronic engine and the second optical engine are coupled via a non-linear electrical connection, and the non-linear electrical connection comprises a ball bonding towards the second electronic engine and a wedge bonding at the second optical engine.

9. The optics based computing system associated with the reception of the at least one optical signal as claimed in claim 7, wherein the second set of position pointers, comprises specific markings made in Gold, the third preform comprises a Gold-Tin layer (GT layer), and the fourth preform comprises a Tin-Silver-Copper layer (TSC layer).

10. The optics based computing system associated with the reception of the at least one optical signal as claimed in claim 7, wherein the system is assembled and performed by:

forming a second base layer with a second set of position pointers, wherein the second set of position pointers are on the second base layer to enable the placement of each of the second optical engine, the second electronic engine, and the second plurality of power couplers;

forming a third preform, wherein the second optical engine is connected to the second base layer, at the third position, via the third preform to configure the reception of the at least one optical signal;

forming the second plurality of gold bumps at the fourth position, wherein the second electronic engine is connected to the second base layer, via the fourth preform to enable the generation of the at least one electrical signal based on the at least one optical signal, each of the second plurality of the power couplers is connected with the second base layer, across the second electronic engine, via the fourth preform to provide the effective power for the second electronic engine, the second electronic engine and the second optical engine are coupled via a non-linear electrical connection, and the non-linear electrical connection comprises a ball bonding towards the second electronic engine and a wedge bonding at the second optical engine.

11. The optics based computing system associated with the reception of the at least one optical signal as claimed in claim 8, wherein the non-linear electrical connection connects the second electronic engine and the second optical engine in a zig-zag arrangement.

12. A method for enabling an optics based computing system associated with transmission of at least one optical signal, wherein the method comprising:

obtaining at least one electrical signal, wherein a first electronic engine of the optics based computing system is configured to generate the at least one electrical signal;

generating, by a first optical engine of the optics based computing system, at least one optical signal based on the at least one electrical signal; and transmitting the at least one optical signal by the first optical engine of the optics based computing system, wherein the optics based computecomputing system comprises:

a first base layer;

the first electronic engine connected to the first base layer;

a first plurality of power couplers connected to the first base layer;

the first optical engine connected to the first base layer; and a first set of position pointers, wherein the first set of position pointers are on the first base layer to enable placement of each of:

the first electronic engine, the first plurality of power couplers, and the first optical engine, the first electronic engine is connected to the first base layer, at a first position, via a first plurality of gold bumps, each of the first plurality of the power couplers is connected to the first base layer, across the first electronic engine, via a first preform to provide effective power for the first electronic engine, and the first optical engine is connected to the first base layer, at a second position, via a second preform.

13. The method as claimed in claim 12, wherein the first set of position pointers, comprises specific markings made in Gold, the first preform comprises a Tin-Silver-Copper layer (TSC layer), and the second preform comprises a Gold-Tin layer (GT layer).

14. A method for enabling an optics based computing system associated with reception of at least one optical signal, wherein the method comprising:

receiving the at least one optical signal by a second optical engine of the optics based computing system;

generating, by a second electronic engine of the optics based computing system, at least one electrical signal based on the at least one optical signal; and processing the generated at least one electrical signal, wherein the optics based computing system comprises:

a second base layer;

the second optical engine connected to the second base layer;

a second plurality of power couplers connected to the second base layer;

the second electronic engine connected to the second base layer; and a second set of position pointers, wherein the second set of position pointers are on the second base layer to enable placement of each of:

the second optical engine, the second electronic engine, and the second plurality of power couplers, the second optical engine is connected to the second base layer, at a third position, via a third preform to receive the at least one optical signal, the second electronic engine is connected to the second base layer, at a fourth position, via a second plurality of gold bumps to generate at least one electrical signal based on the received at least one optical signal, and each of the second plurality of the power couplers is connected to the second base layer, across the second electronic engine, via a fourth preform to provide effective power for the second electronic engine.

15. The method as claimed in claim 14, wherein the second set of position pointers, comprises specific markings made in Gold, the third preform comprises a Gold-Tin layer (GT layer), and the fourth preform comprises a Tin-Silver-Copper layer (TSC layer).

* * * * *